United States Patent

Williams

[15] 3,665,469

[45] May 23, 1972

[54] APPARATUS FOR IMPROVING THE LANE RESOLUTION CAPABILITIES OF OMEGA NAVIGATION RECEIVERS

[72] Inventor: Melvin F. Williams, Washington, D.C.

[73] Assignee: The United States of America as represented by the Secretary of the Navy

[22] Filed: Feb. 27, 1970

[21] Appl. No.: 14,913

[52] U.S. Cl. ............................................ 343/105, 328/155
[51] Int. Cl. ...................................................... G01s 1/30
[58] Field of Search .................................. 328/155; 343/105

[56] References Cited

UNITED STATES PATENTS 3,493,971  2/1970  Earp .................................. 343/105 R
3,564,425  2/1971  Brok .................................. 328/155 X Primary Examiner—Carl D. Quarforth
Assistant Examiner—J. M. Potenza
Attorney—R. S. Sciascia, Arthur L. Brannings and J. G. Murray

[57] ABSTRACT

The invention consists of a system to improve the lane resolution of Omega Navigation Receivers. By measuring the average phase offset of the 3.4 kHz signal from the 10.2 kHz signal due to propagation variations, the offset can be added to the 3.4 kHz phase measurement to provide spatial coincidence of the 10.2 and 13.6 kHz lanes and thus provide better lane resolution of the 10.2 kHz lane.

4 Claims, 4 Drawing Figures

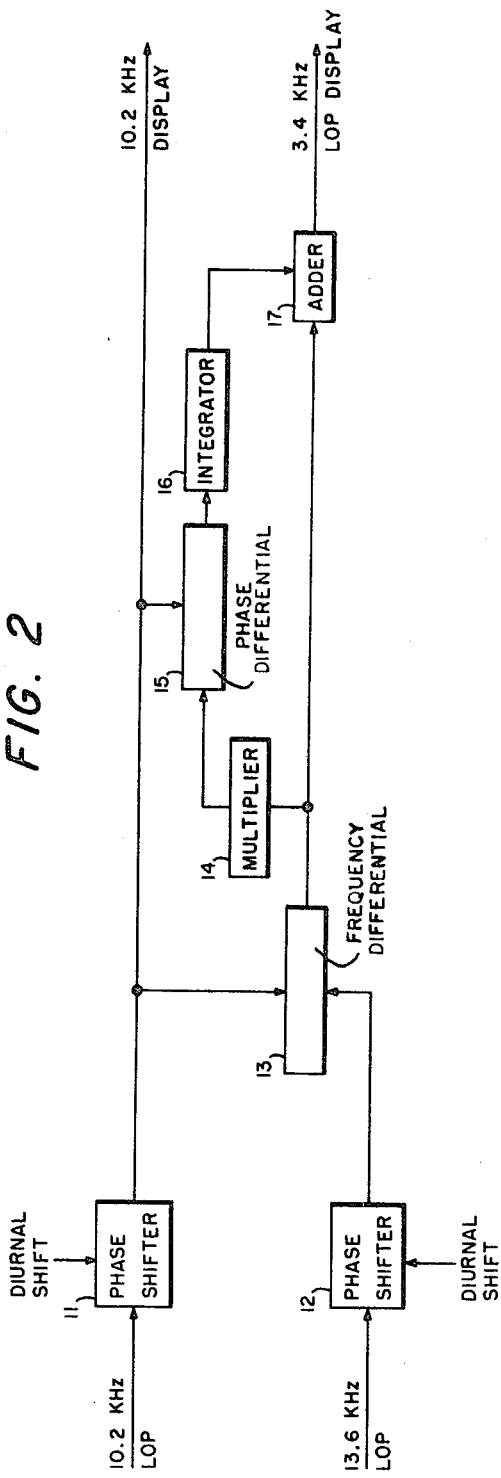

APPARATUS FOR IMPROVING THE LANE RESOLUTION CAPABILITIES OF OMEGA NAVIGATION RECEIVERS

STATEMENT OF GOVERNMENT INTEREST

The invention described herein may be manufactured and used by or for the Government of the United States for governmental purposes without the payment of any royalties thereon or therefor.

BACKGROUND OF THE INVENTION

In the field of long range radio navigation systems, it has been the general practice to employ receiving apparatus for determining position either by use of hyperbolic or circular coordinates.

One such long range radio navigation system with which this invention may be utilized is the Omega System. The operation of this system is described in report number AD-63900 by Pierce, Palmer, Watt and Woodward, available from the Defense Documentation Center, entitled "Omega - a World Wide Navigational System."

The Omega System is a vlf (10 to 14 kHz) radio navigation system which will provide complete worldwide coverage with only eight transmitting stations. Omega, which provides position fixing with moderate (1 mile) accuracy, is usable by aircraft, ships, land vehicles, and submarines at moderate antenna depths. The system fills a requirement which has not been met by any preceding navigation system; celestial navigation is not all-weather; present electronic systems cannot provide global coverage; and inertial systems are expensive, limited in accuracy, and degrade with time.

Each of eight transmitting stations transmits a 10.2 kHz signal for approximately one second in turn. Each transmitter is synchronized with all other transmitters; that is, all antenna currents are in absolute phase regardless of the transmitter's location. This is accomplished by the use of four atomic frequency standards at each transmitter location. The cesium (primary) frequency standards will be connected through combiner circuits to provide an output at the mean frequency of the four standards. The resulting output is applied to a frequency synthesizer which produces all frequencies required for the Omega signal format. In this manner the timing error between stations is reduced to one microsecond or less.

Since the transmissions are phase-locked, the difference signal field-phase is everywhere stationary. The relative phase angle of a particular pair of signals (from any two transmitting stations) at any given point depends solely upon the difference between the distance to one of the stations and the distance from the other. Furthermore, the same phase angle will be observed at all points which have the same differences in distance from the stations. (The matter of resolving the resulting ambiguities will be discussed later.) The loci of such points form a contour of constant phase (isophase contour: fixed on the surface with respect to the locations of the corresponding pair of transmitters). The relative radio frequency phase of every pair of signals observed at any point on the earth defines a known isophase contour which contains that point. The intersection of two such contours established by different pairs of stations defines the location of a point.

The navigator can determine the line of position generated by any convenient pair of stations and then cross it with one or more lines derived from another pair or pairs of stations to obtain a position fix. The navigator will be able to choose position lines by Omega much as he chooses celestial lines of position - for greatest accuracy and for large crossing angles. He may make readings on four or five lines of position, but usually will choose the two pairs that jointly give the greatest precision at his particular location.

The fundamental measurement performed by the Omega receiver is the determination of the relative phase of the 10.2 kHz signals from at least two pairs of stations. This measurement establishes two or more lines of position and thus, a position fix. The receiver may be manual or partly or fully automatic, the degree of automation required being determined by the type of vehicle in which the receiver is employed. To obtain a fix with a manual receiver, the operator adjusts the receiver to read the lines of position he has chosen. Thereafter, the operation of the receiver will be automatic in the tracking of these signals, until the operator modifies his choice of pairs, or until arrival at his destination. The indication of position lines is continuous and may be recorded for the convenience of the navigator.

At 10 second intervals, each of the Omega stations transmits for approximately 1 second at the basic frequency of 10.2 kHz. When observed at any given point, the combined transmissions of all eight stations form a repeating 10 second cycle composed of the 10.2 kHz segments. Each segment of the cycle will be of a different amplitude and phase because of the differences in distances to the transmitting stations. As previously mentioned, the radio frequency phases of all transmissions are phase-locked, which causes the relative phases of all signal components to be everywhere stationary. This establishes a fixed pattern of a family of isophase contours which define positions in hyperbolic coordinates. On the base line between stations, the ambiguous hyperbolic lane width is 98 microseconds 8 miles).

The stations always transmit in the same order with the length of transmission varying from 0.9 to 1.1 and to 1.2 seconds. The identity of the transmissions of a particular station is established by the time of occurrence in the sequence. An alternative method of station identification can be established by reference to Standard Time.

The 10.2 kHz portion of the Omega signal format forms a complete radio-location signal by which position can be defined in respect to the basic position contour pattern. The relative phase angles of the 10.2 kHz signals of each pair of stations define a family of contour patterns equal in number to twice the distance between stations in wavelengths and spaced one-half wavelength (8 miles) apart on the base line. Only one contour of the family contains the position of the observer, and a means must be provided whereby the 8 mile ambiguity can be resolved.

Resolution of the lane ambiguity is the process of selecting, from among all the lanes in which the observer might be located, the particular lane that does contain his position. Thus, lane identification consists essentially of establishing the position of the observer by independent means, to within a one-half lane.

In order to resolve the lane ambiguity, additional signals are transmitted by the Omega stations. Each station of the eight transmits a 13.6-kHz signal, one segment later in the multiplex sequence. The 13.6-kHz transmissions are phase-locked to Standard Time and hence to the 10.2-kHz signals. The combined transmissions of the eight stations establish a second pattern of isophase contours with three quarters of the lane width of the 10.2-kHz pattern. Since both patterns are families of hyperbolae about the same points, the two patterns are everywhere parallel. The combination of the two patterns forms broad lanes with 3 times the width of the basic 10.2-kHz pattern (24 miles on its base line).

The length-coding pattern of the 13.6-kHz transmissions is identical with the coding pattern of the 10.2-kHz signals. This allows the same multiplex timing to be used in the receiver to separate signals in either channel. Since each station transmits its two frequencies in adjacent segments of the sequence, the two transmissions of each station are always of different durations. In a manual visual type receiver, the additional transmissions at 13.6-kHz provide the first stage of lane identification. The 13.6-kHz signals are utilized by retuning the receiver and observing the phase relationships of the signals occurring one place later in the multiplex sequence than those observed at 10.2-kHz. The differences of the corresponding indications at the two frequencies indicate which of the three lanes in a broad lane contains the observer. If the difference is less than one-third cycle, the observer is in the first lane of the three; if between one-third and two-thirds, the observer is in the middle lane, and if between two-thirds and one cycle, the observer is in the third lane.

The unambiguous lane width on a base line is thus expanded from the 8 miles of the basic 10.2-kHz phase contour pattern to 24 miles. Further expansion of the unambiguous lane width can be obtained by additional transmissions at other related frequencies. For example, a third set of transmissions at a frequency of 11.333 kHz defines a pattern of isophase contours with a spacing of nine-tenths of basic 10.2-kHz pattern. There is then a triple coincidence every nine 10.2 kHz lanes, every ten 11.333 kHz lanes and every 12 13.6 kHz lanes, extending the unambiguous lane width on the base line to 72 miles.

The difference between the relative phase at 10.2 kHz and 13.6 kHz (3.4 kHz) provides contours with a lane width of 24 miles, the difference between the 10.2 kHz and 11.333 kHz signals (1.133 kHz)supplies a lane width of 72 miles.

The lane accuracy of Omega can be considered in two parts. One is the effect of natural random fluctuations in the times of propagation of the radio signals and the other is the actual average velocity of propagation. Charts, tables, or both are provided to relate the daytime Omega readings to the geographic position. Because there are minor diurnal and annual changes in the velocity of propagation, the navigator will also be given compensation graphs or tables that permit him to reduce his observed readings to equivalent daytime readings before he consults his main chart or table. This information can be stored in a computer or computed as required.

The successful resolution of lane ambiguities by phase difference measurements at several frequencies depends on the stability and predictability of ionospheric propagation at the frequencies involved. For reliable lane identification the uncertainty in predictability must be consistently less than half a fine lane width at all seasons and times and at all ranges from the transmitting stations within the recommended coverage area. Several factors including velocity dispersion, diurnal and seasonal propagation changes and the ratios between the difference frequency and fine lane frequency determine the reliability of lane identification.

The lane resolution capabilities of the Omega navigation system are not adequate at all times and at all places primarily because of the inability to predict propagation variations to the required accuracy. It has been found that the 13.6 kHz signal is not always affected by the atmosphere to the same degree as the 10.2 kHz signal, that is, there is a phase offset between the two signals. Thus, if there is a signal loss, upon reacquisition of the signal the navigator might incorrectly determine his 10.2 kHz lane, resulting in an 8 mile error. Thus, if the 3.4 kHz phase offset results in an error greater than 4 miles (one half lane) the lane count will be incorrect.

SUMMARY OF THE INVENTION

Accordingly, the general purpose of this invention is to provide a radio navigation receiver which embraces all the advantages of similarly employed aircraft receivers and possesses none of the aforedescribed disadvantages. To obtain this, the present invention contemplates a unique system of measuring the average phase offset between the 10.2 kHz Omega signal and the 3.4 kHz signal. This phase shift is stored and then used to modify the 3.4 kHz signal phase after a lost signal is reacquired.

OBJECTS OF THE INVENTION

It is therefore an object of the present invention to provide a system for identifying the correct lane in a hyperbolic continuous wave radio position finding system.

Another object of the present invention is to provide a long range navigation system capable of correcting for propagation variations of transmitted signals.

A still further object of the present invention is to rezero the broad lanes with the fine lanes in the Omega navigation system.

Yet another object of the present invention is to provide a radio navigation receiving system which operates automatically after the interruption of signals to indicate the correct lane and the corresponding position of the aircraft.

BRIEF DESCRIPTION OF THE DRAWING

Other objects and features of the invention will become apparent to those skilled in the art as the disclosure is made in the following description of the invention as illustrated in the accompanying sheet of drawing in which:

FIGS. 1a, 1b and 1c are a diagram of the relationship between the various lanes utilized in the Omega navigation system.

FIG. 2 is a block diagram of the significant portions of the receiver circuit.

DESCRIPTION OF THE PREFERRED EMBODIMENT

Referring now to FIG. 1, there is shown how the Omega lane resolution operates. FIG. 1c is the 1,133 Hz lane zone derived by subtracting the 11.333 kHz signal and 10.2 kHz signal. By reading the phase angle m of this signal, having a 72 mile lane width, the observer can determine in which 3.4 kHz lane the aircraft is located. The 3.4 kHz lane, as shown in FIG. 1b, has a 24 mile lane width and is derived from the 13.6 kHz signal and the 10.2 kHz signal. From this determination n, the exact 10.2 kHz lane location p as shown in FIG. 1a, having an 8 mile lane width, can be located. Thus this method utilizes the wide lane to resolve ambiguity and the narrow, 10.2 kHz lane to retain maximum accuracy. In theory the zero phase lines of all three signals should coincide at the same point as shown in FIG. 1. In practice, however, due to propagation anomalies which are a function of area and times of day, the zero phase lines are shifted. Thus, if the 3.4 kHz signal phase is offset with respect to the 10.2 kHz signal by an angle resulting in a 4 mile or larger difference between the two zero phase signals, an incorrect 10.2 kHz lane will be identified. It is therefore necessary to correct for this relative phase offset between the two signals in order to enhance the Omega lane resolution capabilities. This correction is especially critical after periods of signal loss.

Referring now to FIG. 2, there is shown a system to correct for this phase error. After being detected by an antenna, receiver, phase detectors and tracking servos, (not shown), the 10.2 kHz line of position (LOP) phase difference signal and the 13.6 kHz LOP phase difference signal both RF signals are fed to phase shifters 11 and 12, respectively, where the predicted diurnal phase corrections are added to the two signals. The two output signals from phase shifters 11 and 12 are fed to frequency differential 13, which may be a conventional sine wave superhetrodyne mixer whose output is the 3.4 kHz LOP. The 10.2 kHz LOP is displayed and is also fed to the phase differential 15, which may comprise zero crossing detectors coupled to a multivibrator or any other means for measuring the phase difference between two signals. Phase comparators may be found in the Manual of Classification of the Patent Office Class 307, subclass 232 or Class 328, subclass 133 for example where its phase is compared with the 3.4 kHz signal phase which has been multiplied by 3 by multiplier 14 which may be any conventional multiplier such as found at Page 547 of vol. 19 of the Radiation Laboratory Series of MIT, 1947. Ideally the zero phase of the two signals should coincide, but if they differ, the phase difference is integrated for a selected period of time and stored in integrator 16. The integrated phase offset signal stored in integrator 16 is added to the 3.4 kHz LOP signal in adder 17 before being displayed. Should the Omega signals ever be lost, upon reacquisition this offset, added to the 3.4 kHz signal, will improve coincidence of the zero phase lines of the 10.2 and 13.4 kHz lanes. As is obvious, during signal loss, the Omega receiver would operate in its dead reckoning mode as described in U.S. Pat. No. 3,388,397 issued June 11, 1968 to A. F. Thornhill and M. F. Williams.

Of course, two such block diagrams are required to obtain the two LOPs required for a fix. In addition, a similar block diagram will be required to rezero the 1,133 Hz lane with respect to the 10.2 kHz lane. If a circular mode is utilized rather than the hyperbolic mode, the lane widths would be doubled but the circuitry would remain the same. The block diagram disclosed above can be either mechanical, analog or digital.

It can be seen that the present ratio navigation receiving system encompasses the ability of self correction after a period of signal loss, and enhances the lane resolution of the Omega system.

While a particular embodiment of the invention has been illustrated and described, it will be recognized that many modifications and changes will occur to those skilled in the art and it is therefore contemplated by the appended claims to cover such modifications as fall within the true spirit and scope of the invention.

What is claimed is:

1. A radio navigation system for eliminating phase offset between two received signals due to environmental conditions comprising:
   receiving means to receive predetermined signals;
   a first signal and a second signal;
   means for multiplying said first signal whereby it has the same frequency as said second signal;
   differential means for indicating the phase difference between said multiplied first signal and said second signal;
   averaging and storing means connected to said differential means for calculating and storing the average phase difference indicated by said differential means; and
   means connected to said storing means for varying the phase of said unmultiplied first signal by said stored phase difference signal whereby said first signal and second signal are in phase.

2. A system as recited in claim 1 including means for deriving said first signal by subtracting a third signal from said second signal.

3. A system as recited in claim 2, including phase shifters between said receiving means and said deriving means for inserting diurnal phase corrections to said second and third signals.

4. A system as recited in claim 3, wherein said first signal is 3,400 Hz, said second signal is 10,200 Hz, said third signal is 11,333 Hz, said three signals being included in the Omega navigation system.

* * * * *